United States Patent [19]
Morrissette

[11] Patent Number: 4,603,879
[45] Date of Patent: Aug. 5, 1986

[54] UTILITY CART

[76] Inventor: Roger J. Morrissette, P.O. Box 1399, Southbridge, Mass. 01550

[21] Appl. No.: 634,890

[22] Filed: Jul. 27, 1984

[51] Int. Cl.⁴ .............................................. B62B 1/20
[52] U.S. Cl. .................................. 280/652; 280/47.26; 280/655
[58] Field of Search ............ 280/652, 655, 657, 47.25, 280/47.26, 47.33, 47.37 R, 63, 204, 639, 658, 647, 650, 47.18, 30, 278, 282, 277

[56] References Cited

U.S. PATENT DOCUMENTS

| | | | |
|---|---|---|---|
| 3,693,993 | 9/1972 | Mazzarelli et al. | 280/47.18 |
| 3,887,208 | 6/1975 | Vidal | 280/652 |
| 4,290,625 | 9/1981 | Barriere | 280/655 |
| 4,316,615 | 2/1982 | Willette | 280/47.18 |
| 4,451,053 | 5/1984 | Alioa et al. | 280/47.37 R |

FOREIGN PATENT DOCUMENTS 320831 7/1919 Fed. Rep. of Germany ... 280/47.25
193883 1/1965 Sweden ................................. 280/652

Primary Examiner—David M. Mitchell
Assistant Examiner—Eric D. Culbreth
Attorney, Agent, or Firm—Blodgett & Blodgett

[57] ABSTRACT

A utility cart having first and second frame portions, a pair of wheels for supporting the second frame portion, a storage compartment mounted on the first frame portion, and a seat mounted on the second frame portion. The second frame portion includes a support foot which with the two wheels forms three support points for supporting the cart that is stationary. A handle is mounted on the second frame portion for lifting the foot from the ground so that the cart can be wheeled.

3 Claims, 6 Drawing Figures

U.S. Patent  Aug. 5, 1986  Sheet 2 of 2  4,603,879
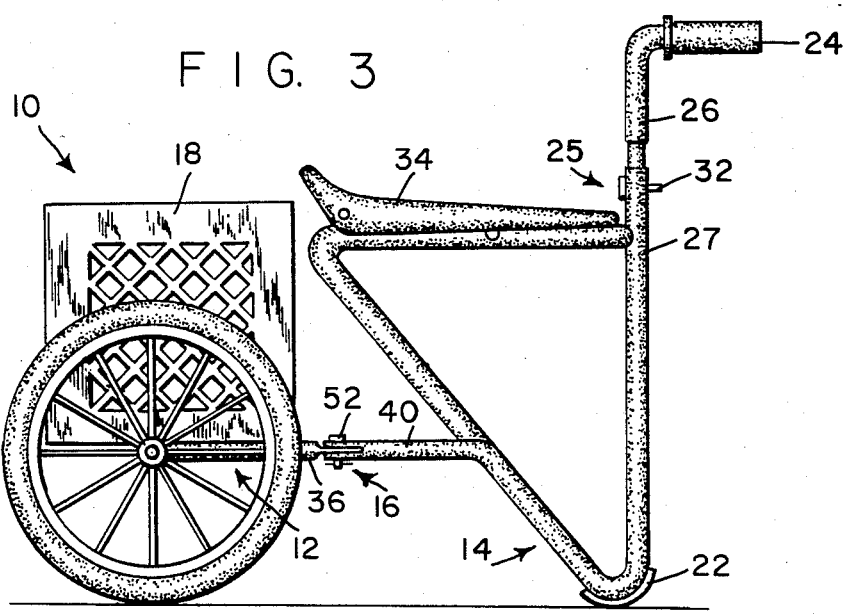
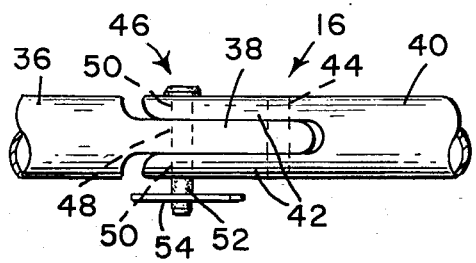
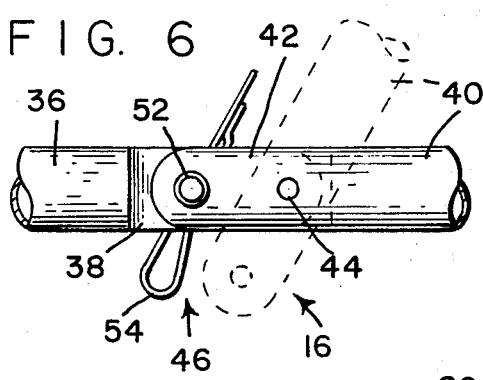
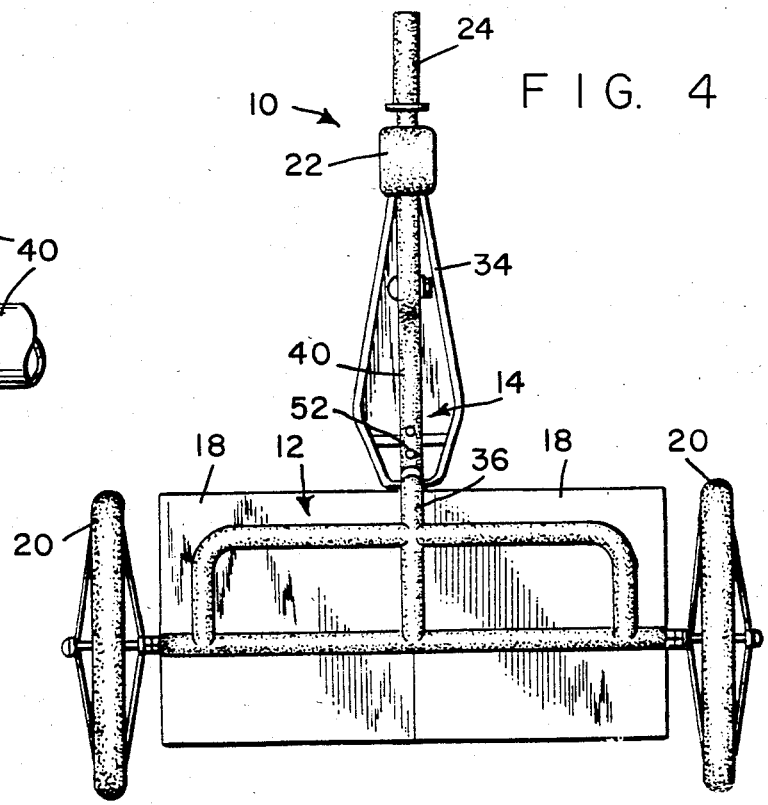

UTILITY CART

BACKGROUND OF THE INVENTION

The present invention is generally directed to a multi-purpose utility cart and is particularly directed to a utility cart for use in a variety of sports and leisure activities.

Many types of wheeled carts have been developed for specific purpose, as for example, golf, shopping, gardening, newspaper delivery, etc. Each type of cart is designed for a specific purpose and cannot be conveniently used for other purposes. There are many types of sport and leisure activities for which no carts have been specifically developed, for example, horse shows, surf and ice fishing and beaching. In horse shows, for example, a great deal of equipment must be carried from the horse trailer to the arena. The distance between the trailer and the arena varies for different fair grounds and can sometimes be as much as a quarter of a mile. The equipment to be carried includes water, and grooming gear, such as brushes, hoof oil, fly spray, coat spray, and polishing rags. Since the horse may be involved in different classes or events, extra tact is very often needed, such as saddle, bridle and blanket. Since the horse must also be led to the arena, at least two people are required to bring the horse and equipment to the arena and, in most cases, there is too much equipment for two people. Also, while one individual is participating in a particular event, there is usually no place for the other person to sit.

In the sport of ice and surf fishing, fishing gear and bait must be carried from the parking area to the fishing location. In the case of surf fishing, fishing gear includes a large surf casting rod, a stand for the rod, a variety of lures, live bait and lunch. The ice fisherman must carry tilts, a shiner bucket, an ice chisel and lunch or snacks. In each type of fishing, the fisherman must wait for long periods of time between bites. For this reason, a folding chair or cart is also included as part of the fishing equipment.

In the case of beaching, there is no limit to what people bring to the beach. Although the list is endless, it usually includes blankets, snorkeling equipment, radio, food, beach ball, inflatable raft, suntan lotion, kites, etc. A typical scene at the beach is the entire family walking from the parking area looking for an unoccupied section of beach with arms laden with equipment. Carts which have been developed for other activities are totally unsuitable for these particular activities.

It is, therefore, a principle object of the present invention to provide a utility cart which can be used for a plurality of sport and leisure activities.

Another object of this invention is the provision of a utility cart which has a storage compartment for carrying various types of sports and recreational equipment and a seat for use when the cart is not being used for carrying equipment.

A further object of the present invention is the provision of a utility cart which has a foldable frame to form a compact configuration for easy storage.

It is another object of the instant invention to provide a utility cart which can be manufactured inexpensively, using conventional parts without the use of special tooling.

A still further object of the present invention is the provision of a utility cart which is simple in construction, which is inexpensive to manufacture, and which is capable of a long life of useful service with a minimum of maintenance.

With these and other objects in view, as will be apparent to those skilled in the art, the invention resides in the combination of parts set forth in the specification and covered by the claims appended hereto.

SUMMARY OF THE INVENTION

In general, the invention consists of a utility cart for various sport and leisure activities. The cart is provided with a first frame portion which is supported on a pair of wheels and which, in turn, supports a storage compartment. A second frame portion is operatively connected to the first frame portion and includes a support foot which, with the wheels, forms three support points for the cart for supporting the cart when it is stationary. A handle and a seat are mounted on the second frame portion. More specifically, the second frame portion is pivotally connected to the first frame portion to enable the cart to be folded into a compact configuration and means are provided for locking the second frame portion in the open or operative configuration.

BRIEF DESCRIPTION OF THE DRAWINGS

The character of the invention, however, may be best understood in reference to one of its structural forms, as illustrated by the accompanying drawings, in which:

FIG. 3 is a left-hand elevational view of the cart, FIG. 4 is a bottom plan view of the cart, FIG. 5 is an enlarged fragmentary side elevational view of connecting means for the two portions of the frame, and FIG. 6 is a fragmentary plan view of the connecting means shown in FIG. 5.

DESCRIPTION OF THE PREFERRED EMBODIMENT

Figure 1:
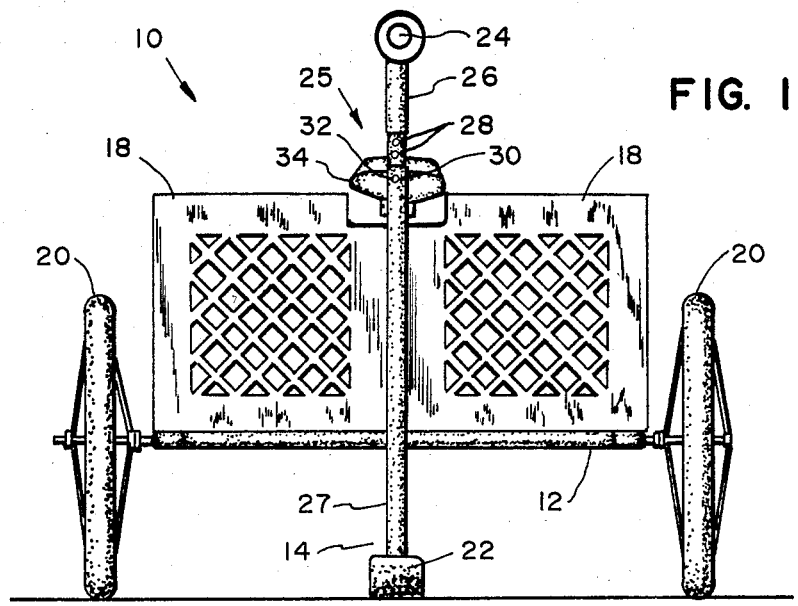
FIG. 1 is a front elevational view of a utility cart embodying the principles of the present invention.
Figure 2:
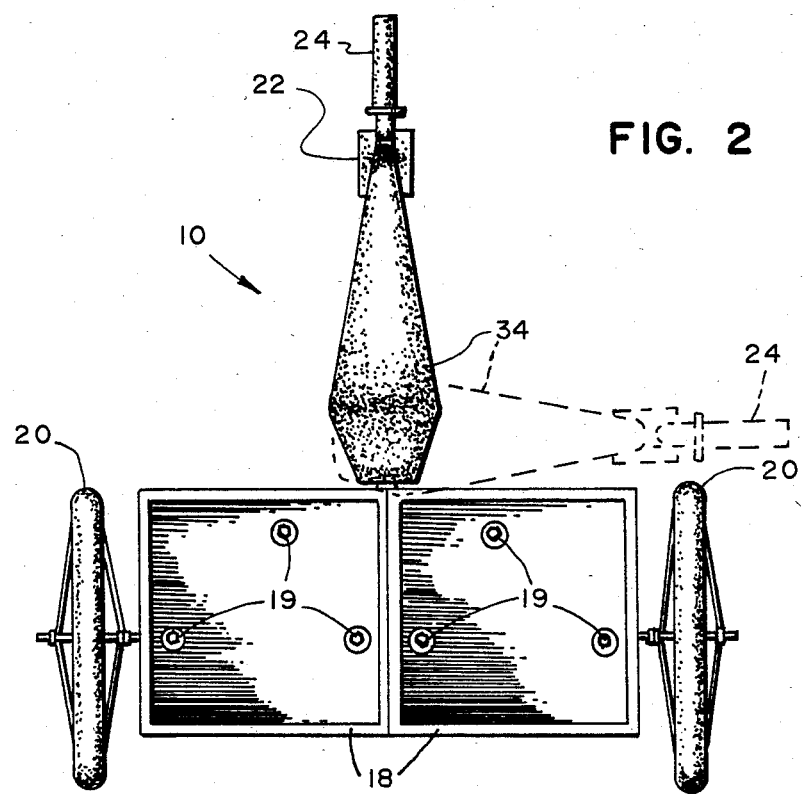
FIG. 2 is a top plan view of the cart.

Referring first to FIGS. 1–4, the utility cart of the present invention is generally indicated by reference numeral 10 and comprises a first frame portion 12 and a second frame portion 14 connected to the frame first portion by connecting means, generally indicated by the reference numeral 16. A pair of storage compartments 18 are attached to the first frame portion 12 by means of fasteners 19. A pair of wheels 20 are mounted on the first frame portion 12 for rotation about a horizontal axis just below the storage compartments 18. A support foot 22 in the form of a broad curved plate is fixed to the bottom of the second frame portion 14. The support foot 22 and the wheels 20 constitute three support points for supporting the cart when it is at rest. A handle 24 is located at the top of the second frame portion 14 and is vertically adjustable by adjusting means, generally indicated by the reference numeral 25. Adjusting means 25 comprises a first vertical tube 26 which is fixed to the handle 24 and is telescopingly mounted within the second vertical tube 27 which forms part of the second frame portion 14. The first tube 26 is provided with a plurality of apertures 28 which are adapted to be selectively aligned with an aperture 30 in a tube 27. The tube 26 is maintained in a selected vertical position by means of a locking pin 32 which extends through one of the selected apertures 28 and the aperture 30. A seat 34 is mounted on the second frame portion 14 between the handle 24 and the storage compartments 18.

Referring also to FIGS. 5 and 6, the connecting means 16 comprises a forwardly extending horizontal bar 36 which forms part of the first frame portion 12 and a rearwardly extending horizontal bar 40 which forms part of the second frame portion 14. The horizontal bar 36 has a flatened end 38 and the bar 40 has a forked end 42 which is adapted to straddle the flatened end 38, as shown in FIG. 5. The forked end 42 is pivotally mounted on the flattened end 38 by means of a pivot pin 44. This allows the second frame portion 14 to be moved from the operational position shown in full lines in FIGS. 2-4 in which the second frame portion lies generally in the plane which is transverse to the rotational axis of the wheels 20, to a folded position in which the second frame portion 14 lies in a plane which is essentially parallel with the rotational axis of the wheel 20, as shown in dotted lines in FIG. 2. The second frame portion 14 is maintained in the operational position shown in full lines in FIGS. 2-4 by locking means, generally indicated by the reference numeral 46. Locking means 46 comprises an aperture 48 in the flattened end portion 38 and a pair of vertically aligned apertures 50 in a forked end 42 which are vertically aligned with the aperture 48 when the second frame portion 14 is in the operational position. A locking pin 52 extends through the apertures 48 and 50 to prevent the forked end 42 from pivoting on the flattened end 38. The locking pin 52 is held in place by a cotter pin 54 which extends through an aperture in the lower end of the pin 52 which extends below the forked end 42. It is preferred that all elements of the first and second frame portions be made of round tubular stock for strength and lightness except for the ends 38 and 42 which form the connecting means 16.

The operation and advantages of the present invention will now be readily understood in view of the above description. The cart 10 is shown at rest in its normal operating position in FIGS. 1-4, wherein the cart is fully supported on the ground by means of the wheels 20 and the foot 22. The cart is adapted to support the full weight of a person sitting on the seat 34. When the cart is to be used for transporting purposes, the handle 24 is grasped and lifted upwardly so that the foot 22 is lifted free of the ground. The cart 10 can then be rolled on the wheels 20 forwardly or backwardly by pulling or pushing the handle 24. The weight of the material to be transported in the storage compartments 18 is concentrated over the rotational axis of the wheels 20 so that the cart can be moved with very little effort. After use, the cart 10 can be folded into a compact configuration by first removing the cotter pin 54 from the locking pin 52 and thereafter removing the locking pin 52 from the ends 38 and 42. This allows the end 42 to pivot relative to the end 38 about the pivot pin 44 to assume the position shown on dotted lines in FIG. 2. The configuration of the cart 10 can be reduced even further by lowering the handle 24 to its lowest setting and rotating the tube 26 180° relative to the tube 27 so that the handle 24 extends above the seat 34. In its folded condition, the cart 10 will fit very nicely within the trunk space of a car or other storage area during non-use.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Cart comprising:
   (a) a first frame portion,
   (b) a storage compartment which is supported on the first frame portion,
   (c) a pair of wheels which are mounted on the first frame portion on opposite sides of the storage compartment for rotation about a horizontal axis, said wheels forming two support points for said cart,
   (d) a second frame portion which is operatively connected to said first frame portion so that said second frame portion lies substantially in a plane which is at a right angle to said axis, said second frame portion having a support foot which forms a third support point for said cart for supporting said cart when it is stationary, said second frame portion is pivotally connected to said first frame portion for movement between and operative position in which said second frame portion is located with said plane to an inoperable position in which said second frame portion lies in a plane which is parallel with said axis and adjacent said storage compartment so that said cart defines a more compact configuration for storage, said pivotal connection including releasable locking means for locking said second frame portion in said operative position,
   (e) a handle which is mounted on the second frame portion and which is vertically spaced from said foot for lifting said foot from the ground to enable the cart to be pushed or pulled on said wheels, and
   (f) a seat mounted on the second frame portion so that it is located vertically between said handle and said support foot and horizontally between said handle and said storage compartment.

2. Cart as recited in claim 1, wherein said handle is mounted on said second frame portion for vertical adjustment.

3. Cart as recited in claim 2, wherein the mounting for vertical adjustment of said handle comprises:
   (a) a first vertical tube forming part of said second frame portion,
   (b) a second tube which is attached to said handle and which is telescopingly mounted on said first tube, and
   (c) means for fixing said second tube in at least two predetermined positions relative to said first tube.

* * * * *